US008437484B2

(12) United States Patent
Tang

(10) Patent No.: US 8,437,484 B2
(45) Date of Patent: May 7, 2013

(54) SWITCHING CIRCUIT AND ELECTRONIC DEVICE USING THE SAME

(75) Inventor: Xing-Hua Tang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 273 days.

(21) Appl. No.: 12/967,009

(22) Filed: Dec. 13, 2010

(65) Prior Publication Data

US 2012/0093325 A1 Apr. 19, 2012

(30) Foreign Application Priority Data

Oct. 18, 2010 (CN) .......................... 2010 1 0510076

(51) Int. Cl.
*H02B 1/00* (2006.01)

(52) U.S. Cl.
USPC ................ 381/123; 381/81; 381/85; 381/120

(58) Field of Classification Search .................... 381/74, 381/77, 79–81, 123, 85, 120
See application file for complete search history.

(56) References Cited

U.S. PATENT DOCUMENTS

| | | | | |
|---|---|---|---|---|
| 5,910,991 | A * | 6/1999 | Farrar | 381/59 |
| 6,567,655 | B1 * | 5/2003 | Wietzke et al. | 455/345 |
| 7,103,189 | B2 * | 9/2006 | Ford | 381/123 |
| 7,986,793 | B2 * | 7/2011 | Wilson | 381/81 |
| 8,249,272 | B2 * | 8/2012 | Chen et al. | 381/94.1 |
| 2002/0102003 | A1 * | 8/2002 | Ford | 381/120 |
| 2006/0165244 | A1 * | 7/2006 | Wu | 381/77 |
| 2011/0103618 | A1 * | 5/2011 | Lemellat et al. | 381/119 |

* cited by examiner

*Primary Examiner* — Disler Paul
(74) *Attorney, Agent, or Firm* — Altis Law Group, Inc.

(57) ABSTRACT

An electronic device includes an audio power amplifier used to output a left and a right channel audio signal, an earphone jack assembly, and a switching circuit automatically switching between a speaker mode and an earphone mode. The audio power amplifier includes a control pin enabling the audio power amplifier to be electrically connected to the speaker. The control pin activated at a low level and disabled at a high level. The switching circuit is capable of enabling the control pin to switch between the low level and the high level. The switching circuit includes a power supply, a first resistor, a second resistor, a third resistor, and a diode. The resistance of the third resistor far exceeds that of the first resistor.

17 Claims, 5 Drawing Sheets

SWITCHING CIRCUIT AND ELECTRONIC DEVICE USING THE SAME

BACKGROUND

1. Technical Field

The present disclosure relates to electronic devices, and particularly to an electronic device with a switching circuit for switching between a speaker mode and an earphone mode.

2. Description of Related Art

An electronic device, such as a DVD player, a MP3 player, or other audio/video devices, usually includes two selectable output modes, a speaker mode and an earphone mode. Generally, a switching circuit is designed to switch to one of the two output modes. For example, when an earphone is electrically connected to the electronic device, the switching circuit automatically selects the earphone mode. When the earphone is disconnected from the electronic device, the switching circuit automatically selects the speaker mode.

However, the switching circuit generally applies a number of relatively expensive transistors. Thus, adding to the cost of producing such audio devices.

Therefore, there is room for improvement in the art.

BRIEF DESCRIPTION OF THE DRAWINGS

The components of the drawings are not necessarily drawn to scale, the emphasis instead being placed upon clearly illustrating the principles of the embodiment of an electronic device with a switching circuit. Moreover, in the drawings, like reference numerals designate corresponding parts throughout the views.

DETAILED DESCRIPTION

Embodiments of the present disclosure will now be described in detail with reference to the drawings.

Figure 1:
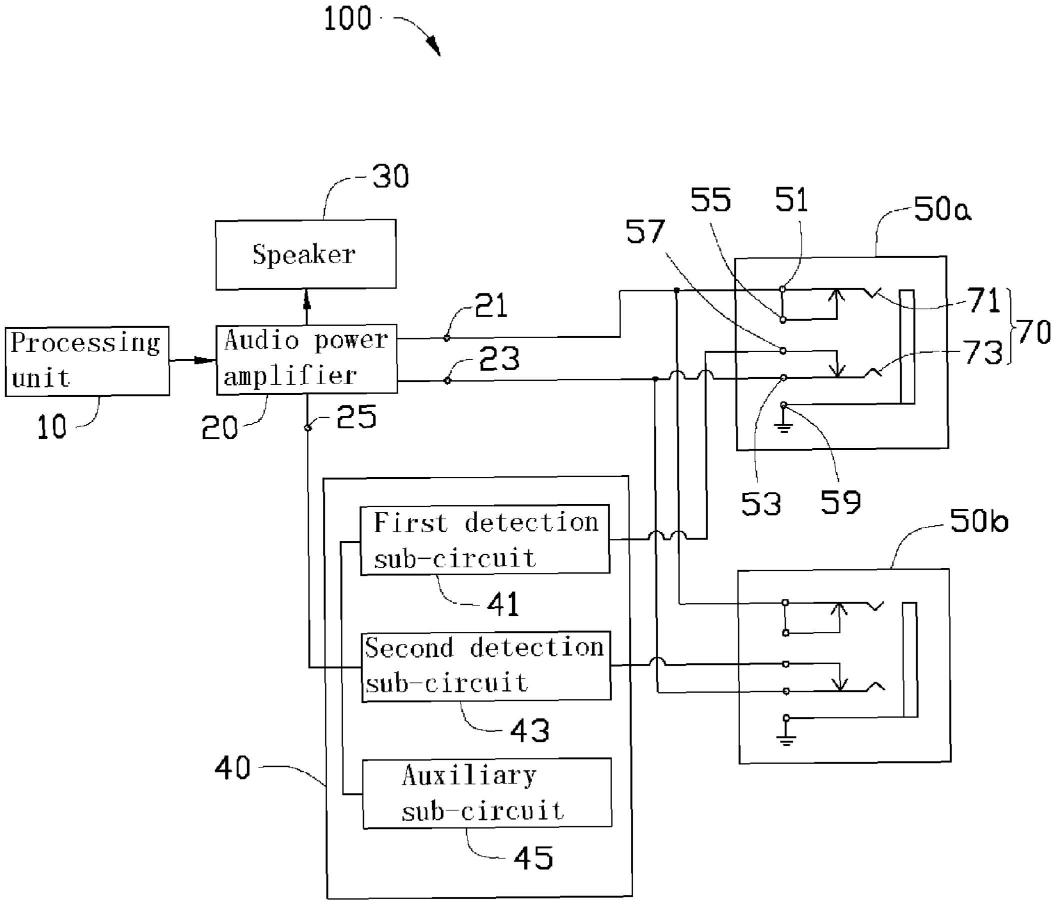
FIG. 1 is a functional block diagram of an electronic device according to an exemplary embodiment, including a switching circuit.

Referring to FIG. 1, an electronic device 100 according to an exemplary embodiment is illustrated. In this embodiment, the electronic device 100 is a DVD player. In other embodiments, the electronic device 100 can be other audio/video devices. The electronic device 100 includes a processing unit 10, an audio power amplifier 20, a speaker 30, a switching circuit 40, and two earphone jack assemblies 50*a*, 50*b*.

The processing unit 10 is electrically connected to the audio power amplifier 20, and is used for driving the audio power amplifier 20 to output an audio signal. The audio signal includes a right channel audio signal and a left channel audio signal.

The audio power amplifier 20 includes a first output pin 21 used to output the left channel audio signal, a second output pin 23 used to output the right channel audio signal, and a control pin 25 used for controlling the audio power amplifier 20 to be electrically connected to the speaker 30. In this embodiment, the control pin 25 is activated at a low level, and is disabled at a high level.

When the speaker 30 is electrically connected to the audio power amplifier 20, the speaker 30 emits sounds according to the right channel audio signal and the left channel audio signal. When the electronic device 100 is in a speaker mode, that is to say the control pin 25 is at the low level, the speaker 30 is activated.

The two earphone jack assemblies 50*a*, 50*b* are capable of being electrically and respectively connected to one earphone (not shown). When the electronic device 100 is in an earphone mode, that is to say the control pin 25 is at the high level, the two earphone jack assemblies 50*a*, 50*b* are activated to emit sounds according to the right channel audio signal and the left channel audio signal. The two earphone jack assemblies 50*a*, 50*b* have the same structure, and one of them (50*a*) is described below.

The earphone jack assembly 50*a* includes a first input port 51 used to input the left channel audio signal, a second input port 53 used to input the right channel audio signal, a first connection port 55 capable of being electrically connected to the first input port 51. A second connection port 57 capable of being electrically connected to the second input port 53, a ground port 59 electrically grounded, and an earphone jack 70 used for receiving a plug of the earphone. Two ends of the two connection ports 55, 57 are electrically connected together (see FIG. 2), and the other two ends of the two connection ports 55, 57 are respectively capable of being electrically connected to the two input ports 51, 53.

The earphone jack 70 includes a first elastic portion 71 and a second elastic portion 73. The first elastic portion 71 is electrically connected to the first input port 51 for transmitting the left channel audio signal. The second elastic portion 73 is electrically connected to the second input port 53 for transmitting the right channel audio signal. The first elastic portion 71 is electrically detachable from the first connection port 55. The second elastic portion 73 is electrically detachable from the second connection port 57. When the plug of the earphone is inserted into the earphone jack 70, the two elastic portions 71, 73 are respectively deformed to disconnect from the two connection ports 55, 57 (see FIG. 4).

The switching circuit 40 is used for automatically selecting one of the speaker mode or the earphone mode as a current mode. In this embodiment, when the two elastic portions 71, 73 are respectively connected to the two connection ports 55, 57, the switching circuit 40 automatically selects the speaker mode; when the two elastic portions 71, 73 are respectively disconnected from the two connection ports 55, 57, the switching circuit 40 automatically selects the earphone mode.

The switching circuit 40 includes a first detection sub-circuit 41, a second detection sub-circuit 43, and an auxiliary sub-circuit 45.

Figure 2:
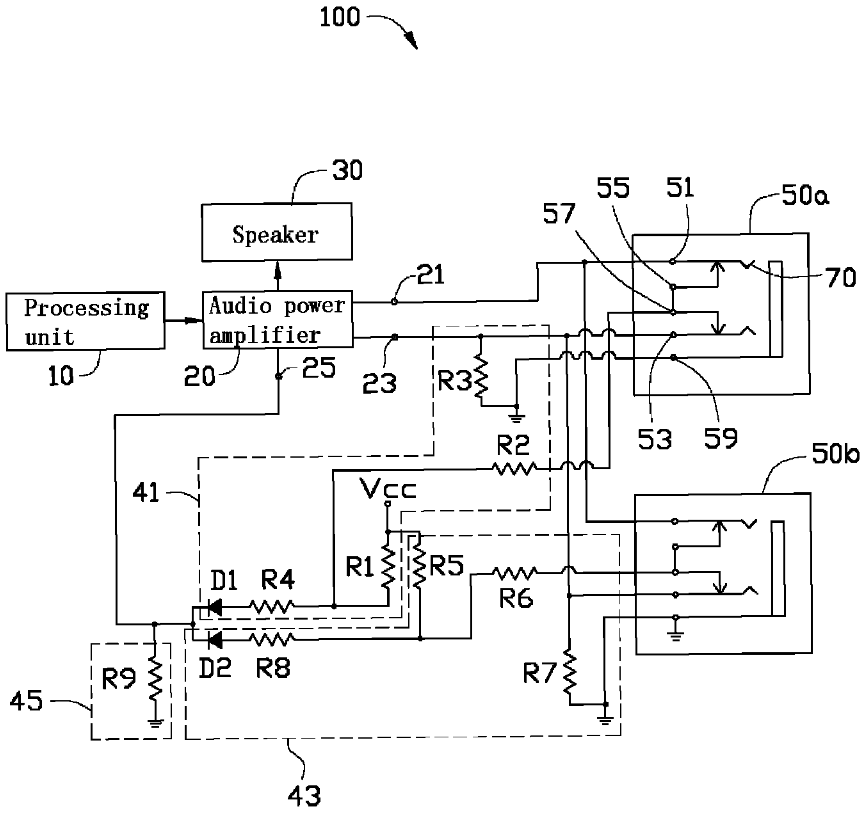
FIG. 2 is a partial circuit diagram of the electronic device of FIG. 1.

Referring to FIG. 2, the first detection sub-circuit 41 includes a first diode D1, a first resistor R1, a second resistor R2, a third resistor R3, and a fourth resistor R4. A cathode of the first diode D1 is electrically connected to the control pin 25 of the audio power amplifier 20, and an anode of the first diode D1 is electrically connected to one end of the fourth resistor R4. The other end of the fourth resistor R4 is electrically connected to a power supply Vcc by the first resistor R1. One end of the second resistor R2 is electrically connected between the fourth resistor R4 and the first resistor R1 to form a first node A, and the other end of the second resistor R2 is electrically connected to the second connection port 57 of the first earphone jack assembly 50*a*. One end of the third resistor R3 is electrically connected to the second output pin 23 of the audio power amplifier 20, and the other end of the third resistor R3 is grounded.

The second detection sub-circuit 43 includes a second diode D2, a fifth resistor R5, a sixth resistor R6, a seventh resistor R7, and an eighth resistor R8. A cathode of the second diode D2 is electrically connected to the control pin 25 of the audio power amplifier 20, and an anode of the second diode D2 is electrically connected to one end of the eighth resistor R8. The other end of the eighth resistor R8 electrically connected to the power supply Vcc by the fifth resistor R5. One end of the sixth resistor R6 is electrically connected between the eighth resistor R8 and the fifth resistor R5 to form a second node B, and the other end of the sixth resistor R6 is electrically connected to the second connection port 57 of the second earphone jack assembly 50*b*. One end of the seventh resistor R7 is electrically connected to the second output pin 23 of the audio power amplifier 20, and the other end of the seventh resistor R7 is grounded.

In this embodiment, the auxiliary sub-circuit 45 includes a ninth resistor R9. One end of the ninth resistor R9 is electrically connected to the control pin 25 of the audio power amplifier 20, and the other end of the ninth resistor R9 is grounded.

The first resistor R1 and the fifth resistor R5 have the same resistance. The first resistor R1 and the fifth resistor R5 are respectively used for pulling up the voltages of the node A and the node B to sustain a high level signal state.

The third resistor R3 and the seventh resistor R7 have the same resistance. The third resistor R3 and the seventh resistor R7 are used for pulling down voltage of the second output pin 23 to sustain a low level signal state.

The second resistor R2 and the sixth resistor R6 have the same resistance. The fourth resistor R4 and the eighth resistor R8 have the same resistance which far exceeds either that of the second resistor R2 and the sixth resistor R6 or that of the third resistor R3 and the seventh resistor R7. The second resistor R2, the sixth resistor R6, the fourth resistor R3, and the eighth resistor R8 are configured for controlling current.

The ninth resistor R9 is used for pulling down voltage of the control pin 25. The resistance of the ninth resistor R9 far exceeds either that of the first resistor R1 and the fifth resistor R5 or that of the fourth resistor R4 and the eighth resistor R8.

In this embodiment, the first resistor R1 and the fifth resistor R5 are 10KΩ; the second resistor R2, the third resistor R3, the sixth resistor R6, and the seventh resistor R7 are 1KΩ; the fourth resistor R4 and the eighth resistor R8 are 100KΩ; the ninth resistor R9 is 1MΩ.

Figure 3:
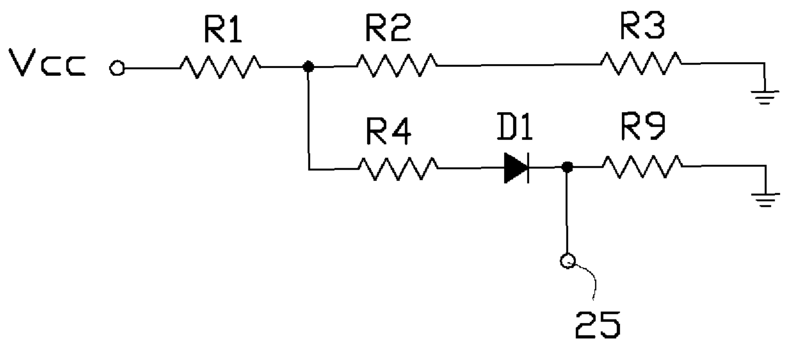
FIG. 3 is an equivalent circuit diagram of the switching circuit of FIG. 2.

Further referring to FIG. 3, when the two elastic portions 71, 73 are respectively connected to the two connection ports 55, 57, an equivalent circuit diagram of the first detection sub-circuit 41 and the auxiliary sub-circuit 45 is shown. The power supply Vcc, the first resistor R1, the second resistor R2, and the third resistor R3 define a first loop circuit. The power supply Vcc, the first resistor R1, the fourth resistor R4, the first diode D1, and the ninth resistor R9 define a second loop circuit. As the resistance of the ninth resistor R9 far exceeds that of the other resistors, hardly any current flows in the second loop circuit. Thus, the voltage of the control pin 25 is at a low level state. The audio power amplifier 20 is activated to be electrically connected to the speaker 30, and the speaker 30 emits sounds according to the right channel audio signal and the left channel audio signal which are from the audio power amplifier 20. The electronic device 100 is in the speaker mode.

Figure 4:
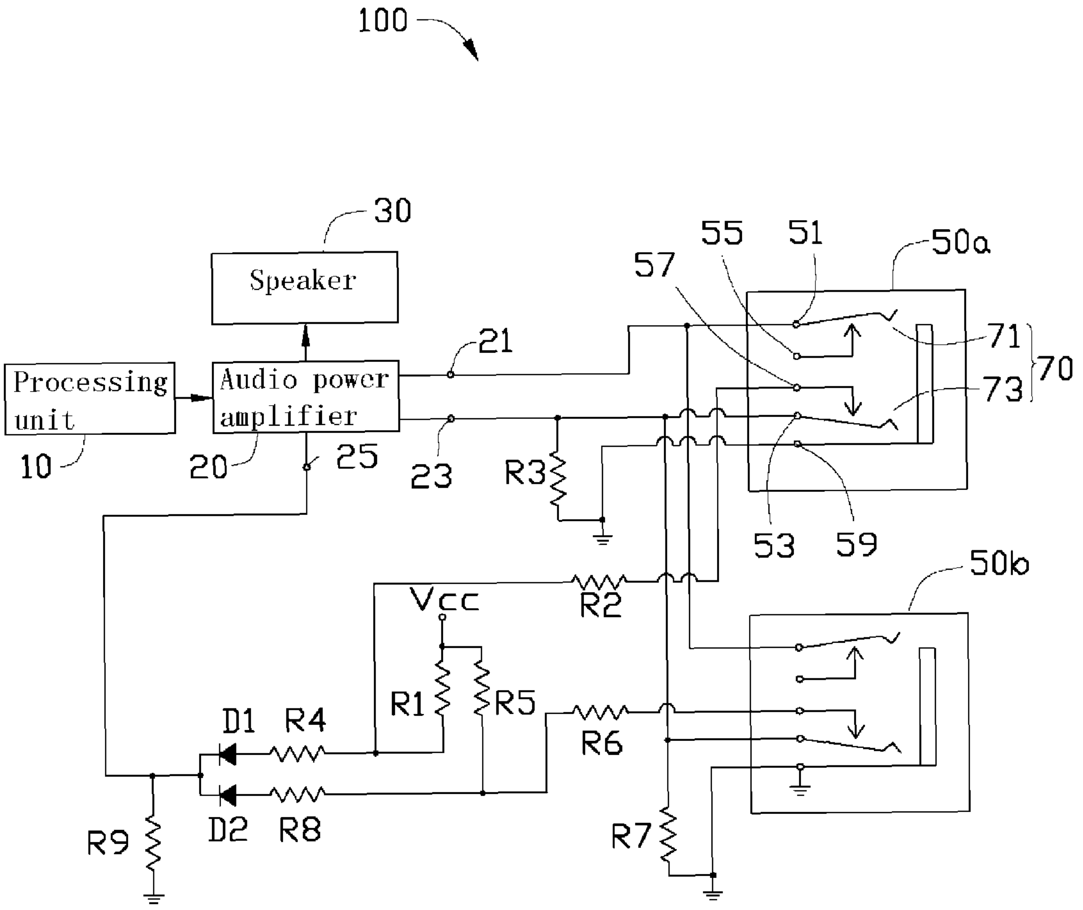
FIG. 4 is similar to FIG. 2, but showing the electronic device in another state.
Figure 5:
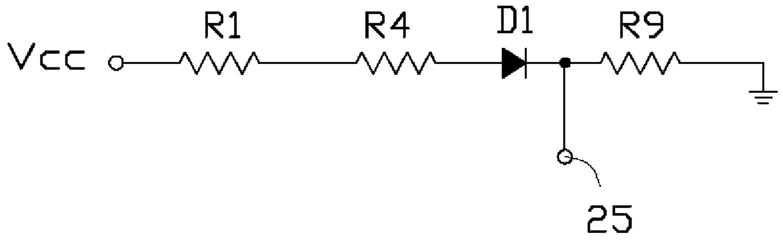
FIG. 5 is an equivalent circuit diagram of the switching circuit of FIG. 4.

Referring to FIG. 4, when the two elastic portions 71, 73 are respectively disconnected from the two connection ports 55, 57, the third resistor R3 is disconnected from the second resistor R2, and the second resistor R2 is in an open circuit loop. Another equivalent circuit diagram of the first detection sub-circuit 41 and the auxiliary sub-circuit 45 is shown in FIG. 5. There is only one loop circuit which is defined by the power supply Vcc, the first resistor R1, the fourth resistor R4, the first diode D1, and the ninth resistor R9. As the resistance of the ninth resistor R9 far exceeds that of the other resistors, most of the voltage of Vcc is distributed across the ninth resistor R9. The voltage drop across the first resistor R1 and the fourth resistor R4 is small and thus, the voltage of the control pin 25 is at a high level state. The audio power amplifier 20 is electrically disconnected from the speaker 30 and electrically connected to the earphone jack assembly 50*a*. The earphone jack assembly 50*a* transmits the right channel audio signal and the left channel audio signal to the corresponding earphone to emit sounds. The electronic device 100 is in the earphone mode.

As discussed above, the electronic device 100 can be freely switched between the speaker mode and the earphone mode. As the switching between a speaker mode and an earphone mode of the electronic device 100 is achieved by only using several resistors and diodes, the cost of manufacturing the electronic device 100 is low.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation to encompass all such modifications and similar arrangements.

What is claimed is:

1. An electronic device, comprising:

a speaker for emitting sounds according to a right channel audio signal and a left channel audio signal;

an audio power amplifier used for outputting the left channel audio signal and the right channel audio signal, the audio power amplifier comprising a control pin enabling the audio power amplifier to be electrically connected to the speaker, the control pin activated at a low level and disabled at a high level;

an earphone jack assembly comprising:

a first input port for inputting the left channel audio signal;

a second input port for inputting the right channel audio signal;

a first connection port capable of being electrically connected to the first input port; and a second connection port capable of being electrically connected to the second input port, the second connection port electrically connected to the first connection port; and a switching circuit capable of enabling the control pin switching between the low level and the high level, the switching circuit comprising:

a power supply;

a first resistor, one end of the first resistor electrically connected to the second input port, and the other end of the first resistor electrically grounded;

a second resistor, one end of the second resistor electrically connected to the second connection port and the other end of the second resistor electrically connected to the power supply;

a third resistor, one end of the third resistor electrically connected to the control pin, and the other end of the third resistor electrically grounded, the resistance of the third resistor far exceeding that of the first resistor; and a diode, a cathode of the diode electrically connected to the control pin, and an anode of the diode electrically connected to the power supply.

2. The electronic device of claim 1, wherein the switching circuit further comprises a fourth resistor, one end of the fourth resistor is electrically connected to the power supply, and the other end of the fourth resistor is electrically connected to the anode of the diode via the second resistor.

3. The electronic device of claim 1, wherein the switching circuit further comprises a fourth resistor, one end of the fourth resistor is electrically connected to the power supply, and the other end of the fourth resistor is electrically connected to the second connection port.

4. The electronic device of claim 2, wherein the switching circuit further comprises a fifth resistor, one end of the fifth resistor is electrically connected to the power supply via the fourth resistor, and the other end of the fourth resistor is electrically connected to the second connection port.

5. The electronic device of claim 4, wherein when the first connection port is electrically connected to the first input port; and the second connection port is electrically connected to the second input port, an equivalent circuit is defined by the power supply, the first resistor, the fourth resistor, and the fifth resistor, and another equivalent circuit is defined by the power supply, the second resistor, the third resistor, the fourth resistor, and the diode.

6. The electronic device of claim 4, wherein when the first connection port is disconnected from the first input port; and the second connection port is disconnected from the second input port, only one equivalent circuit is defined by the power supply, the second resistor, the third resistor, the fourth resistor, and the diode.

7. The electronic device of claim 1, wherein the resistance of the second resistor is less than that of the first resistor.

8. The electronic device of claim 1, wherein the audio power amplifier further comprises:

a first output pin for outputting the left channel audio signal; and a second output pin for outputting the right channel audio signal.

9. The electronic device of claim 1, further comprising a processing unit electrically connected to the audio power amplifier, the processing unit used for driving the audio power amplifier to output the right channel audio signal and the left channel audio signal.

10. The electronic device of claim 1, wherein the earphone jack assembly further comprises an earphone jack receiving a plug of an earphone, the earphone jack comprises a first elastic portion and a second elastic portion, the first elastic portion is electrically connected to the first input port for transmitting the left channel audio signal and is further electrically detachable from the first connection port, the second elastic portion is electrically connected to the second input port for transmitting the right channel audio signal and is further electrically detachable from the second connection port.

11. A switching circuit used in an electronic device for automatically switching between a speaker mode and an earphone mode, the electronic device comprising an audio power amplifier used for outputting a left channel audio signal and a right channel audio signal, and an earphone jack assembly, the audio power amplifier comprising a control pin enabling the audio power amplifier to be electrically connected to the speaker, the control pin activated at a low level and disabled at a high level, the earphone jack assembly comprising a first input port for inputting the left channel audio signal, a second input port for inputting the right channel audio signal, a first connection port capable of being electrically connected to the first input port, and a second connection port capable of being electrically connected to the second input port, the second connection port electrically connected to the first connection port, the switching circuit comprising:

a power supply;

a first resistor, one end of the first resistor electrically connected to the second input port, and the other end of the first resistor electrically grounded;

a second resistor, one end of the second resistor electrically connected to the second connection port and the other end of the second resistor electrically connected to the power supply;

a third resistor, one end of the third resistor electrically connected to the control pin, and the other end of the third resistor electrically grounded, the resistance of the third resistor far exceeding that of the first resistor; and a diode, a cathode of the diode electrically connected to the control pin, and an anode of the diode electrically connected to the power supply.

12. The switching circuit of claim 11, further comprising a fourth resistor, one end of the fourth resistor electrically connected to the power supply, and the other end of the fourth resistor electrically connected to the anode of the diode via the second resistor.

13. The switching circuit of claim 11, further comprising a fourth resistor, one end of the fourth resistor electrically connected to the power supply, and the other end of the fourth resistor electrically connected to the second connection port.

14. The switching circuit of claim 12, further comprising a fifth resistor, one end of the fifth resistor electrically connected to the power supply via the fourth resistor, and the other end of the fourth resistor electrically connected to the second connection port.

15. The switching circuit of claim 14, wherein when the first connection port is electrically connected to the first input port; and the second connection port is electrically connected to the second input port, an equivalent circuit is defined by the power supply, the first resistor, the fourth resistor, and the fifth resistor, and another equivalent circuit is defined by the power supply, the second resistor, the third resistor, the fourth resistor, and the diode.

16. The switching circuit of claim 14, wherein when the first connection port is disconnected from the first input port; and the second connection port is disconnected from the second input port, only one equivalent circuit is defined by the power supply, the second resistor, the third resistor, the fourth resistor, and the diode.

17. The switching circuit of claim 11, wherein the resistance of the second resistor is less than that of the first resistor.

* * * * *